(12) United States Patent
Zhang et al.

(10) Patent No.: US 12,614,751 B2
(45) Date of Patent: Apr. 28, 2026

(54) LITHIUM ION BATTERY AND MANUFACTURING METHOD THEREFOR, AND ELECTRIC VEHICLE

(71) Applicant: BATTERO TECH CORPORATION LIMITED, Shanghai (CN)

(72) Inventors: Wutang Zhang, Shanghai (CN); Duo Zhang, Shanghai (CN); Liang Xiong, Shanghai (CN); Deshun Jiang, Shanghai (CN); Jinxin He, Shanghai (CN)

(73) Assignee: BATTERO TECH CORPORATION LIMITED, Shanghai (CN)

( * ) Notice: Subject to any disclaimer, the term of this patent is extended or adjusted under 35 U.S.C. 154(b) by 707 days.

(21) Appl. No.: 18/082,984

(22) Filed: Dec. 16, 2022

(65) Prior Publication Data

US 2025/0273730 A1      Aug. 28, 2025

Related U.S. Application Data

(63) Continuation of application No. PCT/CN2020/141644, filed on Dec. 30, 2020.

(30) Foreign Application Priority Data

Jun. 18, 2020      (CN) .......................... 202010561854.2

(51) Int. Cl.
*H01M 10/0525*      (2010.01)
*B60L 50/64*      (2019.01)
(Continued)

(52) U.S. Cl.
CPC ......... *H01M 10/0525* (2013.01); *B60L 50/64* (2019.02); *H01M 10/058* (2013.01);
(Continued)

(58) Field of Classification Search
CPC ........... H01M 10/0525; H01M 10/058; H01M 10/647; H01M 10/653; H01M 50/103;
(Continued)

(56) References Cited

U.S. PATENT DOCUMENTS

2007/0026307 A1*   2/2007   Kim .................... H01M 50/538
                                                              429/161
2007/0059592 A1*   3/2007   Takami ............... H01M 50/534
                                                              429/231.95
(Continued)

FOREIGN PATENT DOCUMENTS

CN        201562696 U     8/2010
CN        102569680 A     7/2012
(Continued)

OTHER PUBLICATIONS

International Search Report for the International Application No. PCT/CN2020/141644 issued by the Chinese Patent Office on Mar. 31, 2021.
(Continued)

*Primary Examiner* — Matthew W Van Oudenaren

(57)      ABSTRACT

Provided are an electric vehicle, and a lithium ion battery and a manufacturing method therefor. The lithium ion battery includes a first metal plate, a second metal plate, a metal frame, a battery cell, poles, and an explosion-proof valve; the first metal plate, the metal frame, and the second metal plate are sequentially connected to form a mounting chamber; the battery cell is accommodated in the mounting chamber; the poles are provided on the metal frame in an insulating manner and are electrically connected to the battery cell; the explosion-proof valve is provided on the metal frame; and the metal frame is provided with a liquid injection hole.

11 Claims, 4 Drawing Sheets

(51) Int. Cl.

| | |
|---|---|
| *H01M 10/058* | (2010.01) |
| *H01M 10/647* | (2014.01) |
| *H01M 10/653* | (2014.01) |
| *H01M 50/103* | (2021.01) |
| *H01M 50/119* | (2021.01) |
| *H01M 50/124* | (2021.01) |
| *H01M 50/133* | (2021.01) |
| *H01M 50/188* | (2021.01) |
| *H01M 50/548* | (2021.01) |
| *H01M 50/55* | (2021.01) |

(52) U.S. Cl.
CPC ....... *H01M 10/647* (2015.04); *H01M 10/653* (2015.04); *H01M 50/103* (2021.01); *H01M 50/119* (2021.01); *H01M 50/1245* (2021.01); *H01M 50/133* (2021.01); *H01M 50/188* (2021.01); *H01M 50/548* (2021.01); *H01M 50/55* (2021.01); *H01M 2220/20* (2013.01)

(58) Field of Classification Search
CPC ........... H01M 50/119; H01M 50/1245; H01M 50/133; H01M 50/188; H01M 50/548; H01M 50/55; H01M 50/117; H01M 50/131; H01M 50/30; H01M 50/564; H01M 50/10; H01M 50/116; H01M 50/183; H01M 2220/20
See application file for complete search history.

(56) References Cited

U.S. PATENT DOCUMENTS

| | | | | |
|---|---|---|---|---|
| 2013/0115493 A1* | 5/2013 | Fuhr | ................... | H01M 50/536 |
| | | | | 429/157 |
| 2015/0086841 A1* | 3/2015 | Takami | ............. | H01M 10/0525 |
| | | | | 429/211 |
| 2020/0112010 A1* | 4/2020 | Jiang | ................... | H01M 50/394 |

FOREIGN PATENT DOCUMENTS

| | | | | |
|---|---|---|---|---|
| CN | 102959654 | A | | 3/2013 |
| CN | 206364073 | | * | 7/2017 |
| CN | 206364073 | U | | 7/2017 |
| CN | 107910461 | A | | 4/2018 |
| CN | 109449322 | A | | 3/2019 |
| CN | 111599946 | A | | 8/2020 |
| CN | 212113761 | U | | 12/2020 |
| JP | H10-112296 | A | | 4/1998 |
| JP | H10-189055 | A | | 7/1998 |
| KR | 1020080018476 | | * | 2/2008 |

OTHER PUBLICATIONS

Written Opinion for the International Application No. PCT/CN2020/141644 issued by the Chinese Patent Office on Mar. 31, 2021.
Office Action for European Patent Application No. 20940721.2 issued by the European Patent Office on Sep. 11, 2024.
European Search Report for European Patent Application No. 20940721.2 issued by the European Patent Office on Aug. 16, 2024.
First Search of Chinese Patent Application No. 2020105618542 issued by the Chinese Patent Office on Oct. 16, 2024.
First Office Action of Chinese Patent Application No. 202010561854.2 issued by the Chinese Patent Office on Oct. 18, 2024.
Second Office Action of Chinese Patent Application No. 202010561854.2 issued by the Chinese Patent Office on Feb. 15, 2025.
Rejection Decision of Chinese Patent Application No. 202010561854.2 issued by the Chinese Patent Office on Apr. 17, 2025.
Supplementary Search Report of Chinese Patent Application No. 202010561854.2 issued by the Chinese Patent Office on Apr. 15, 2025.

* cited by examiner

100

100

LITHIUM ION BATTERY AND MANUFACTURING METHOD THEREFOR, AND ELECTRIC VEHICLE

CROSS-REFERENCE TO RELATED APPLICATION

The present disclosure is a bypass continuation of international patent application PCT/CN2020/141644, filed on Dec. 30, 2020, which claims the priority benefit of the Chinese patent application No. 202010561854.2, filed on Jun. 18, 2020, the contents of which are incorporated herein by reference in entirety.

TECHNICAL FIELD

The present disclosure relates to the field of batteries, and particularly to a lithium ion battery and a manufacturing method therefor, and an electric vehicle.

BACKGROUND ART

The lithium ion cell, as a core power component of power batteries, is a key element for marketization of electric vehicles. At present, the pouch-type battery and the aluminum-shell battery are the most common commercial available batteries, which differ in packaging technology. The pouch-type battery has a simple structure, and thus the packaging technology therefor is much easier. Furthermore, the gravimetric energy density and the cost of the pouch-type battery are preferable. Unfortunately, the package of the pouch-type battery is undesirable in long-term reliability, such that the pouch-type battery, in long-term service, has to face the risk of liquid leakage, which endangers electric vehicles equipped with the pouch-type batteries. Whereas the package of the aluminum-shell battery is more reliable; however, the package structure and packaging process of the aluminum-shell battery are complicated, and therefore the aluminum-shell battery has a low gravimetric energy density and high cost.

SUMMARY

An objective of the present disclosure is to provide a lithium ion battery and a manufacturing method therefor, and an electric vehicle. The benefit of the pouch-type battery such as simple structure and light weight and characteristic of the aluminum-shell battery including advantageous reliability and high electrolyte-corrosion tolerance are integrated in the lithium ion battery provided herein. Therefore, the embodiments provided in the present disclosure have reliable performances and low costs, rendering the lithium ion battery cost-effective.

The embodiments of the present disclosure are realized as follows.

In a first aspect, an embodiment of the present disclosure provides a lithium ion battery, including a first metal plate, a second metal plate, a metal frame, a cell, poles (pole columns), and an explosion-proof valve, wherein the first metal plate, the metal frame, and the second metal plate are sequentially connected and form a mounting chamber; the cell is accommodated in the mounting chamber; the poles are provided on the metal frame in an insulating manner and are electrically connected to the cell; the explosion-proof valve is provided on a metal frame; and the metal frame is provided with a liquid injection hole.

In an optional embodiment, the lithium ion battery further includes an insulating sealing member; and the poles are sealedly connected to the metal frame in an insulating manner through the insulating sealing member In an optional embodiment, the poles are punched onto the metal frame.

In an optional embodiment, the cell includes a body, a first tab and a second tab; the first tab and the second tab are provided on the body; and the poles include a first pole electrically connected to the first tab and a second pole electrically connected to the second tab.

In an optional embodiment, the first tab and the second tab are located on the same side or different sides of the metal frame.

In an optional embodiment, the cell is of a shape corresponding to that of the metal frame.

In an optional embodiment, a thermal-conductive coating or an insulating composite coating is provided on an outer surface of the first metal plate and/or an outer surface of the second metal plate.

In an optional embodiment, the thermal-conductive coating is an electrical insulating coating; and/or an outer surface of the insulating composite coating is a graphite thermal-conductive composite film or a graphene thermal-conductive composite film.

In an optional embodiment, the first metal plate is made of a stainless steel, aluminum or an alloy material; and/or the second metal plate is made of a stainless steel, aluminum or an alloy material.

In an optional embodiment, the first metal plate, the second metal plate, and the metal frame are all made of a same material.

In an optional embodiment, a thickness of the first metal plate is 0.02-0.2 mm; and/or a thickness of the second metal plate is 0.02-0.2 mm; and/or a thickness of the metal frame is 0.02-2.00 mm.

In a second aspect, an embodiment of the present disclosure provides a manufacturing method for a lithium ion battery, for manufacturing the lithium ion battery according to any one of the preceding, wherein the method includes:

providing the poles and the explosion-proof valve on the metal frame, and opening the liquid injection hole on the metal frame;

electrically connecting tabs of the cell to the corresponding poles, and fixing the cell onto the metal frame; and providing the first metal plate and the second metal plate on two opposite sides of the metal frame respectively so that the cell is accommodated in the mounting chamber formed by the first metal plate, the metal frame, and the second metal plate.

In an optional embodiment, the step of providing the poles and the explosion-proof valve on the metal frame includes:

punching the poles onto the metal frame, and welding the explosion-proof valve onto the metal frame.

In an optional embodiment, the step of providing the first metal plate and the second metal plate on two opposite sides of the metal frame respectively includes:

welding the first metal plate and the second metal plate on two opposite sides of the metal frame respectively, wherein the welding includes laser welding, electromagnetic welding, and resistance welding.

In an optional embodiment, the method further includes:

providing a thermal-conductive coating or an insulating composite coating on the first metal plate and the second metal plate.

In a third aspect, an embodiment of the present disclosure provides an electric vehicle, including the lithium ion battery according to any one of the preceding embodiments.

For the lithium ion battery and the manufacturing method therefor and the electric vehicle including the lithium ion battery provided in the embodiments of the present disclosure: the outer package structure of the lithium ion battery is formed by the first metal plate, the second metal plate, and the metal frame. The poles and the explosion-proof valve are both provided on the metal frame, and the liquid injection hole is also disposed on the metal frame. In the above, the poles are correspondingly connected to the tabs of the cell, and the liquid injection hole is configured to inject an electrolytic solution into a mounting space formed by the first metal plate, the second metal plate, and the metal frame. The outer package of the lithium ion battery in the embodiments of the present disclosure is made of a metal material, wherein the first metal plate, the second metal plate, and the metal frame have a relatively small thickness, thus being capable of ensuring structural reliability of the lithium ion battery and having a relatively high volumetric energy density. The benefit of the pouch-type battery such as simple structure and light weight and characteristic of the aluminum-shell battery including advantageous reliability and high electrolyte-corrosion tolerance are integrated in the lithium ion battery provided herein. Therefore, the embodiments provided in the present disclosure have reliable performances and low costs, rendering the lithium ion battery cost-effective Meanwhile, the manufacturing method for the lithium ion battery has simple steps and is easy to implement.

BRIEF DESCRIPTION OF DRAWINGS

In order to more clearly illustrate technical solutions of embodiments of the present disclosure, accompanying drawings which need to be used in the embodiments will be introduced below briefly, and it should be understood that the accompanying drawings below merely show some embodiments of the present disclosure, and therefore should not be considered as limitation on the scope, and a person ordinarily skilled in the art still could obtain other relevant accompanying drawings according to these accompanying drawings, without using any creative effort.

Figure 1:
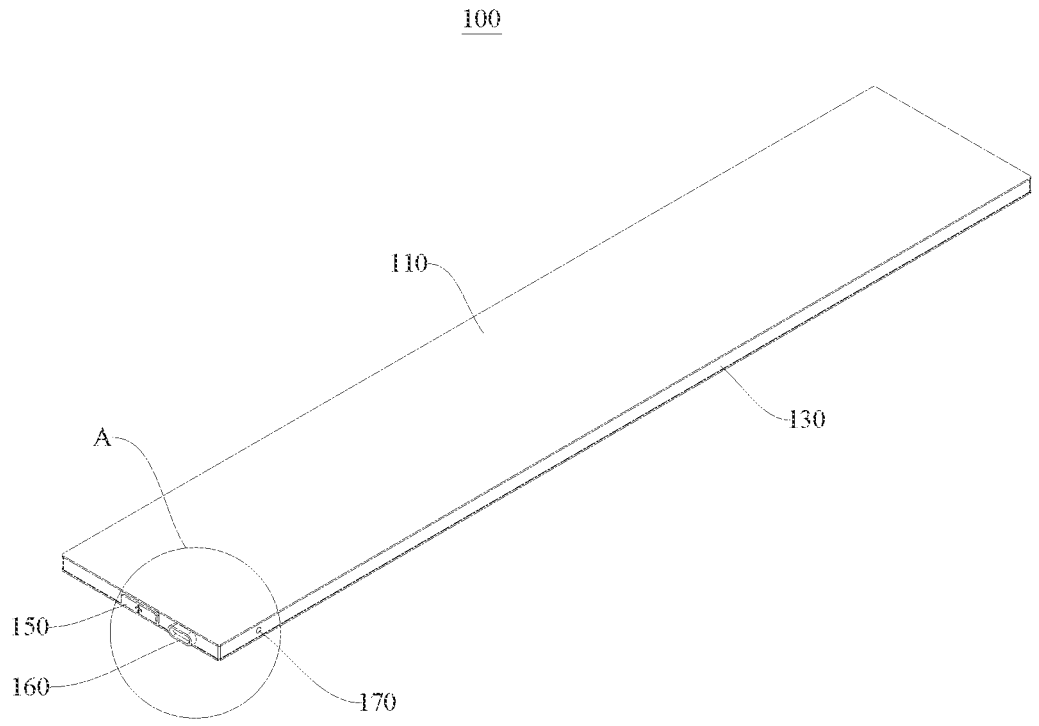
FIG. 1 is a structural schematic view of a lithium ion battery provided in an embodiment of the present disclosure.
Figure 2:
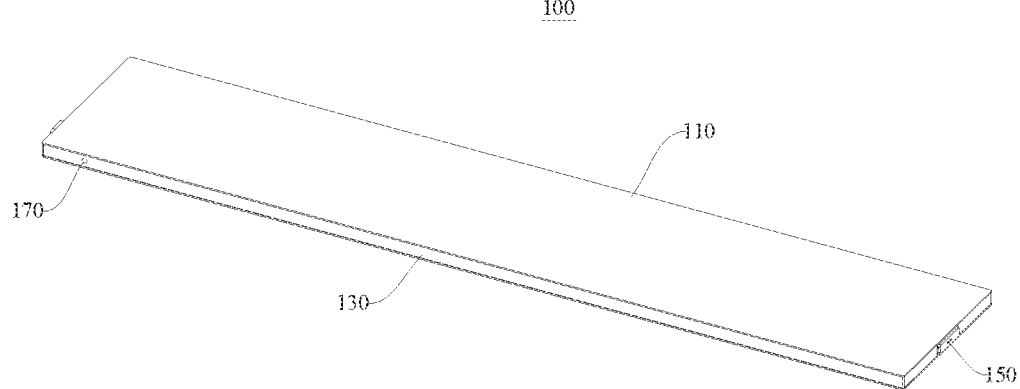
FIG. 2 is a structural schematic view of the lithium ion battery in FIG. 1 from another angle of view.
Figure 3:
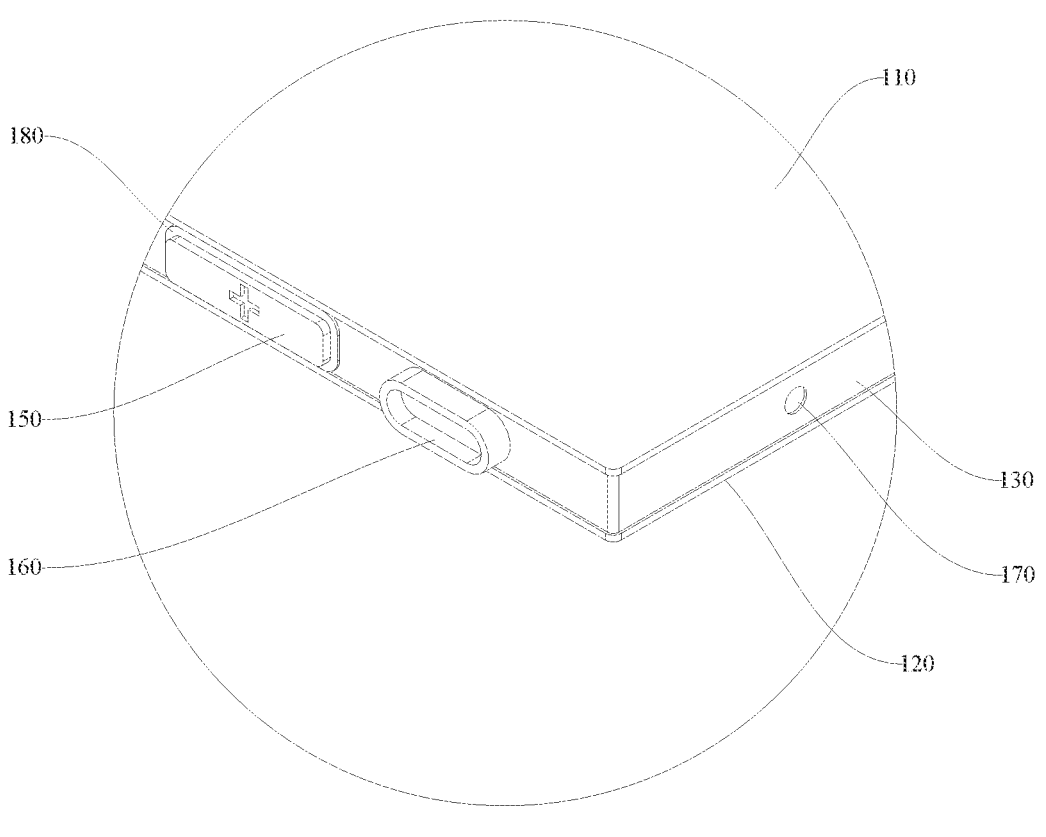
FIG. 3 is an enlarged structural schematic view of an area A in FIG. 1.

Reference signs: 100—lithium ion battery; 110—first metal plate; 120—second metal plate; 130—metal frame; 140—cell; 150—pole; 160—explosion-proof valve; 170—liquid injection hole; 180—insulating sealing member.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in different configurations.

Therefore, the detailed description below of the embodiments of the present disclosure provided in the accompanying drawings is not intended to limit the scope of protection of the present disclosure, but merely represents chosen embodiments of the present disclosure. Based on the embodiments of the present disclosure, all of other embodiments, obtained by a person ordinarily skilled in the art without any creative effort, shall fall within the scope of protection of the present disclosure.

It should be noted that similar reference signs and letters represent similar items in the following accompanying drawings, therefore, once a certain item is defined in one accompanying drawing, it is not necessary to further define and explain it in the subsequent accompanying drawings.

In the description of the present disclosure, it should be noted that the orientation or position relationship indicated by the terms "center", "upper", "lower", "left", "right", "vertical", "horizontal", "inside", "outside", etc. is based on the orientation or position relationship shown in the accompanying drawings, or the orientation or position relationship that is conventionally placed when the inventive product is used, which is only for the convenience of describing the present disclosure and simplifying the description, rather than indicating or implying that the device or element indicated must have a particular orientation, is constructed and operated in a particular orientation, and thus is not to be understood as a limitation on the present disclosure. Besides, terms "first", "second", "third", etc. are merely for distinguishing the description, but should not be construed as indicating or implying importance in the relativity.

Moreover, the terms "horizontal", "vertical" and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "provide", "mount", "link", and "connect" should be understood in a broad sense, for example, a connection may be a fixed connection, a detachable connection, or an integrated connection; it may be a mechanical connection or an electrical connection; it may be direct joining or indirect joining through an intermediary, and it also may be inner communication between two elements. For those ordinarily skilled in the art, specific meanings of the above-mentioned terms in the present disclosure could be understood according to specific circumstances.

Referring to FIG. 1 to FIG. 4, they show a lithium ion battery 100 provided in an embodiment of the present disclosure. The lithium ion battery 100 can be applied to an electric device or apparatus, and supplies power to the electric device or apparatus. The electric device or apparatus may be an electric vehicle or the like, that is, the lithium ion battery 100 provided in the embodiment of the present disclosure may be applied to an electric vehicle or other electric devices or apparatuses.

The lithium ion battery 100 provided in the embodiment of the present disclosure has the advantage of a simple process design and a light weight of a pouch-type structure and the advantage of reliable aluminum package, and can tolerate the corrosion of electrolytic solution for a long time. The embodiments of the present disclosure have reliable performances and low costs, so that the lithium ion battery 100 is cost-effective In an embodiment of the present disclosure, this lithium ion battery 100 includes a first metal plate 110, a second metal plate 120, a metal frame 130, a cell 140, poles 150, and an explosion-proof valve 160, wherein the first metal plate 110, the metal frame 130, and the second metal plate 120 are sequentially connected to form a mounting chamber; the cell 140 is accommodated in the mounting chamber; the poles 150 are provided on the metal frame 130 in an insulating manner and are electrically connected to the cell 140; the explosion-proof valve 160 is provided on the metal frame 130; and the metal frame 130 is provided with a liquid injection hole 170.

It should be noted that, in an embodiment of the present disclosure, the mounting chamber formed by the first metal plate 110, the second metal plate 120, and the metal frame 130 in the above is configured to mount the cell 140, that is, the first metal plate 110, the second metal plate 120, and the metal frame 130 are an outer package structure of the lithium ion battery 100.

Optionally, for an embodiment of the present disclosure, the outer package structure may be made of a stainless steel material, that is, the first metal plate 110, the second metal plate 120, and the metal frame 130 are all of stainless steel structures. Of course, the present disclosure is not only limited thereto, and in other embodiments of the present disclosure, the outer package structure also may be of a pure aluminum material or an aluminum alloy material, etc.

It should be understood that the stainless steel or aluminum itself has better thermal conductive performance than aluminum-plastic composite film or steel-plastic composite film, has thermal-conductive performance, and can eliminate heat-conducting aluminum plate between cells in the pouch-type module, thus further improving the energy density of a power battery pack. Meanwhile, the cost of the packaging material also can be reduced, which is beneficial to improving the price-performance ratio of the product.

Optionally, the first metal plate 110, the second metal plate 120, and the metal frame 130 in the above are made of a same material, for example, a same steel plate is cut to form the first metal plate 110 and the second metal plate 120, thus simplifying the manufacturing steps and saving the process cost. However, the present disclosure is not limited thereto, and the first metal plate 110, the second metal plate 120, and the metal frame 130 also may be made of different materials.

Optionally, when the first metal plate 110, the second metal plate 120, and the metal frame 130 are made of stainless steel, they may be made of austenitic stainless steel, ferritic stainless steel, or austenitic-ferritic duplex stainless steel, or the like. Of course, the first metal plate 110, the second metal plate 120, and the metal frame 130 in the above may be made of any stainless steel material therein, for example, all of the first metal plate 110, the second metal plate 120, and the metal frame 130 are made of austenitic stainless steel, or the first metal plate 110 is made of austenitic stainless steel, the second metal plate 120 and the metal frame 130 are made of ferritic stainless steel or the like.

Optionally, when the first metal plate 110, the second metal plate 120, and the metal frame 130 are made of aluminum alloy material, they may be 1-series pure aluminum or aluminum alloy, 3-series aluminum-manganese alloy, 5-series aluminum-magnesium alloy, 6-series aluminum-silicon alloy or the like. Of course, the first metal plate 110, the second metal plate 120, and the metal frame 130 in the above may be made of any aluminum alloy material therein, for example, all of the first metal plate 110, the second metal plate 120, and the metal frame 130 are made of the 3-series aluminum-manganese alloy, or the first metal plate 110 is made of the 3-series aluminum-manganese alloy, the second metal plate 120 and the metal frame 130 are made of the 5-series aluminum-magnesium alloy or the like.

Optionally, the first metal plate 110 and the second metal plate 120 have substantially the same thickness, so that the first metal plate 110 and the second metal plate 120 are manufactured from the same metal plate, so that the manufacturing process of the lithium ion battery 100 is simpler. The thickness of the first metal plate 110 may be 0.02-0.2 mm (including two endpoint values), for example, the thickness of the first metal plate 110 is 0.03 mm; further, the thickness of the first metal plate 110 may be 0.05-0.15 mm (including two endpoint values), for example, the thickness of the first metal plate 110 is 0.10 mm; likewise, the thickness of the second metal plate 120 may be 0.02-0.2 mm (including two endpoint values), for example, the thickness of the second metal plate 120 is 0.04 mm; further, the thickness of the second metal plate 120 may be 0.05-0.15 mm (including two endpoint values), for example, the thickness of the second metal plate 120 is 0.12 mm.

It should be particularly noted that, the thicknesses of the first metal plate 110 and the second metal plate 120 may be substantially equal to each other, and also may be flexibly set according to actual design requirements, for example, the thickness of the first metal plate 110 is greater than the thickness of the second metal plate 120. The thickness relationship between the first metal plate 110 and the second metal plate 120 is not specifically limited in the embodiments of the present disclosure.

Optionally, the thickness of the metal frame 130 may be 0.02-2.00 mm (including two endpoint values), for example, the thickness of the metal frame 130 is 0.05 mm; further, the thickness of the metal frame 130 is 0.10-1.0 mm (including two endpoint values), for example, the thickness of the metal frame 130 is 0.15 mm.

In an embodiment of the present disclosure, the mounting chamber formed by the first metal plate 110, the second metal plate 120, and the metal frame 130 has a dimension slightly greater than that of the cell 140, so that the cell 140 is accommodated in the mounting chamber, which helps to improve the volumetric energy density of the power battery, moreover, the thickness of the first metal plate 110, the second metal plate 120, and the metal frame 130 is relatively thin, which can further improve the volumetric energy density of the battery.

Optionally, connection manners between the first metal plate 110 and the second metal plate 120 and the metal frame 130 include, but are not limited to, laser welding, electromagnetic welding, and resistance welding, etc.

In an optional embodiment, the lithium ion battery 100 further can include an insulating sealing member 180; and the poles 150 are sealedly connected to the metal frame 130 in an insulating manner through the insulating sealing member 180.

Further, a material of the insulating sealing member 180 may be a polymer insulating material, an engineering plastic, or a ceramic insulating material.

Optionally, the poles 150 can be punched onto the metal frame 130. The punching process is simple and the technical principle is mature, which is beneficial to making the manufacture simpler and more convenient.

In an optional embodiment, the above cell 140 may include a body, a first tab and a second tab; the first tab and the second tab are provided on the body; and the poles 150 include a first pole electrically connected to the first tab and a second pole electrically connected to the second tab.

It should be understood that the first tab and the second tab in the above are positive and negative electrode tabs respectively, the first pole and the second pole are positive and negative electrode poles respectively, and the positive and negative electrode tabs are in one-to-one correspondence with the positive and negative electrode poles.

In an optional embodiment, the first pole and the second pole are located on the same or different sides of the metal frame 130. In the above, the lithium ion battery 100 shown in FIG. 1 and FIG. 2 has the first pole and the second pole located on two opposite sides, while in the solution shown in FIG. 5, the first pole and the second pole are located on the same side of the metal frame 130. In the embodiments of the present disclosure, positions of the first pole and the second pole on the metal frame 130 are not specifically limited, that is, the first pole and the second pole may be flexibly disposed as required.

In an optional embodiment, the shape of the cell 140 is corresponding to the shape of the metal frame 130. The metal frame 130 may be in a rectangular shape, and in this case, the shape of the cell 140 is in a rectangular shape corresponding to the shape of the metal frame 130; the metal frame 130 also may be in other shapes, such as a diamond shape or an irregular shape, and correspondingly, the shape of the cell 140 is corresponding to the shape of the metal frame 130, so that the manufactured lithium ion battery 100 has better adaptability, and meets the requirements of different products on the shape of batteries.

In an optional embodiment, a thermal-conductive coating or an insulating composite coating is provided on an outer surface of the first metal plate 110 and/or an outer surface of the second metal plate 120.

Further, the thermal-conductive coating may be an electrical insulating coating; and an outer surface of the insulating composite coating may be a graphite thermal-conductive composite film or a graphene thermal-conductive composite film.

Optionally, an outer surface of the first metal plate 110 and/or an outer surface of the second metal plate 120 is coated with a layer of thermal-conductive coating, wherein the coating is an electrical insulating coating.

Optionally, a layer of thermal-conductive and insulating composite coating is directly adhered to an outer surface of the first metal plate 110 and/or an outer surface of the second metal plate 120, wherein the coating is a graphite thermal-conductive composite film or a graphene thermal-conductive composite film with an outer surface of PET.

It should be noted that the "first metal plate 110 and/or second metal plate 120" in the above refers to that at least one of the former and the latter meets the condition, for example, "an outer surface of the first metal plate 110 and/or an outer surface of the second metal plate 120 is provided with a layer of thermal-conductive coating" refers to at least the following three cases: a first case is that the thermal-conductive coating is provided on the outer surface of the first metal plate 110; a second case is that the thermal-conductive coating is provided on the outer surface of the second metal plate 120; and a third case is that the thermal-conductive coating is provided on the outer surfaces of both the first metal plate 110 and the second metal plate 120.

Figure 4:
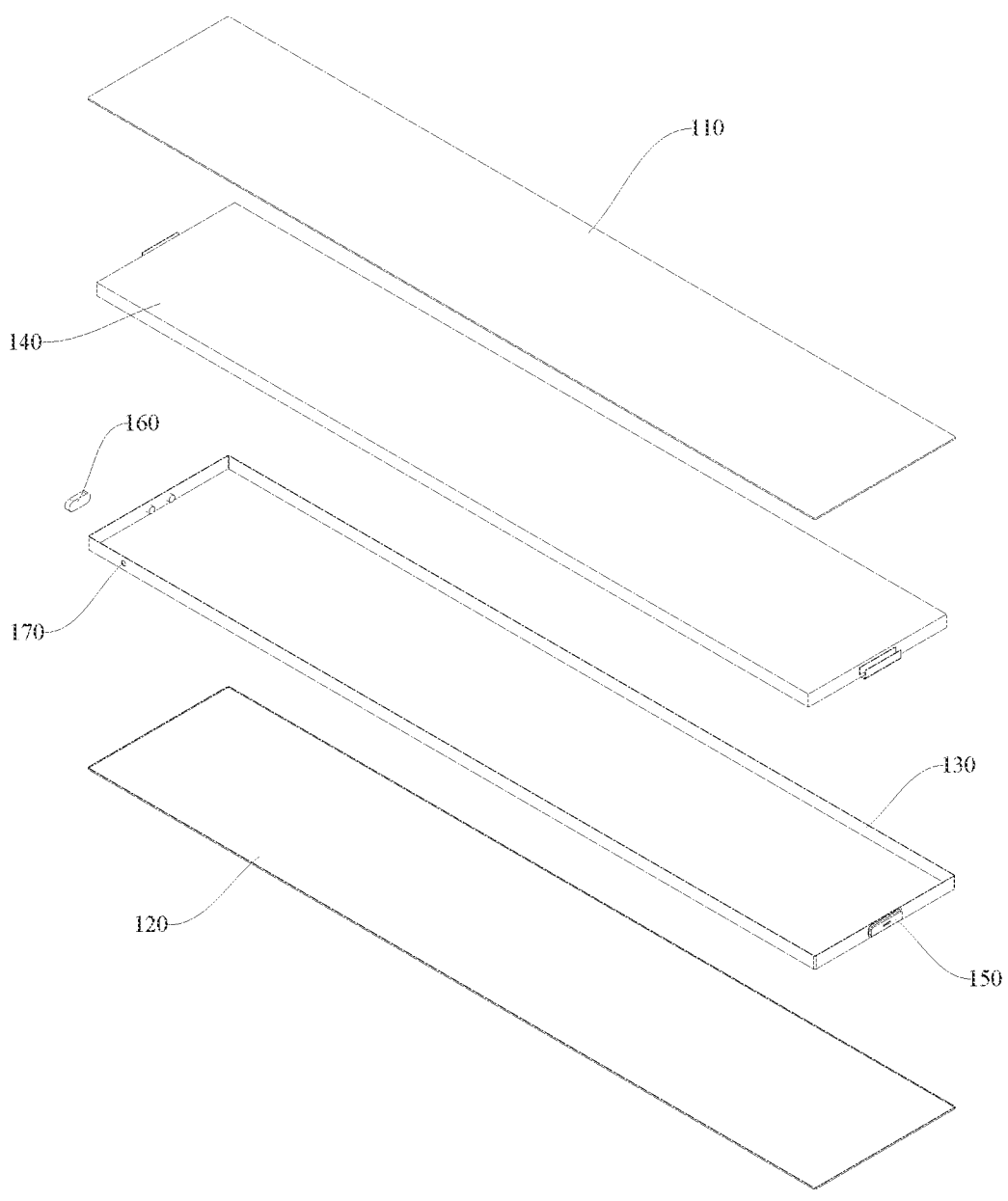
FIG. 4 is an exploded structural schematic view of FIG. 1 or the lithium ion battery in FIG. 1.
Figure 5:
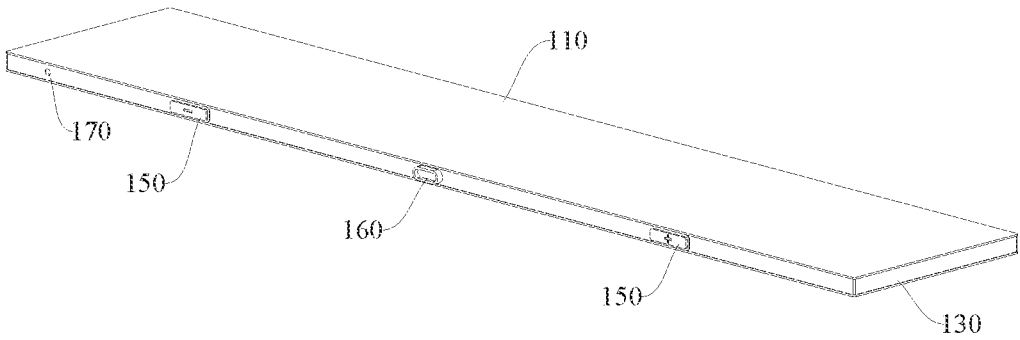
FIG. 5 is a structural schematic view of a lithium ion battery provided in another embodiment of the present disclosure.

Referring to FIG. 4 and FIG. 5, in the present disclosure, the lithium ion battery 100 includes a first metal plate 110, a second metal plate 120, a metal frame 130, a cell 140, poles 150, and an explosion-proof valve 160, a liquid injection hole 170 is provided on the metal frame 130, and two poles 150 are provided. In the above, in FIG. 4, the two poles 150 are respectively located on two opposite sides of the metal frame 130, and the liquid injection hole 170 is provided on the other adjacent side; in FIG. 5, the poles 150, the explosion-proof valve 160, and the liquid injection hole 170 are all disposed on the same side of the metal frame 130, the explosion-proof valve 160 is located between two poles 150 and is substantially accommodated in a middle position between the two poles 150, and the liquid injection hole 170 is close to one of the poles 150.

Figure 6:
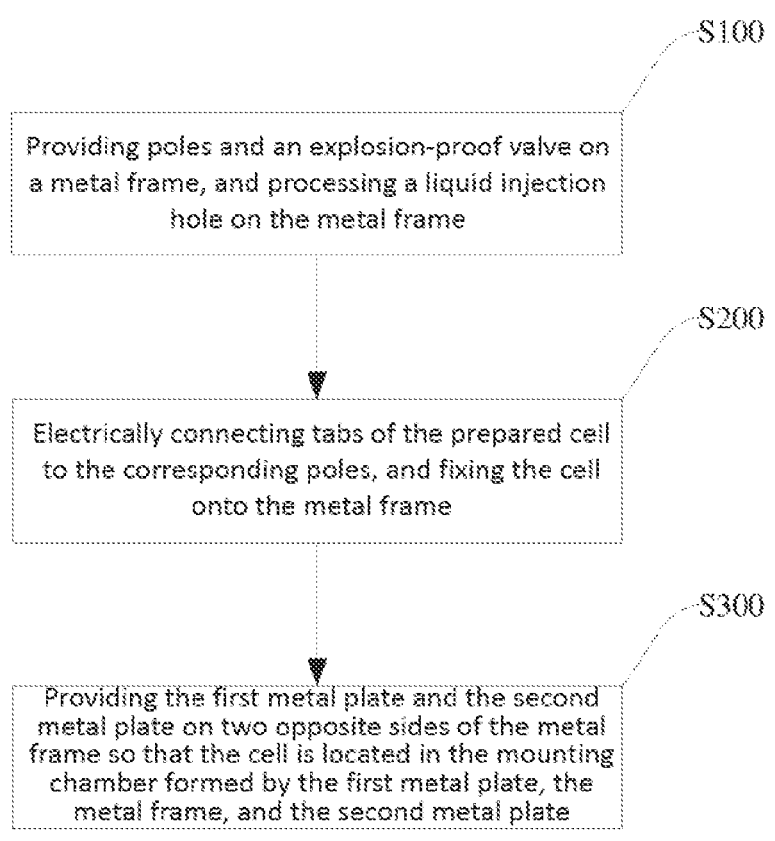
FIG. 6 is a schematic flow block diagram of a manufacturing method for a lithium ion battery provided in an embodiment of the present disclosure.

Referring to FIG. 6, an embodiment of the present disclosure provides a manufacturing method for a lithium ion battery 100, for manufacturing the above lithium ion battery 100, wherein the method includes the following steps.

Step S100: providing poles 150 and an explosion-proof valve 160 on a metal frame 130, and opening a liquid injection hole 170 on the metal frame 130.

In an optional embodiment, the above step S100 may include a sub-step S110: punching the poles 150 onto the metal frame 130, and welding the explosion-proof valve 160 onto the metal frame 130.

It should be understood that after the metal frame 130 is molded, the poles 150 and the explosion-proof valve 160 may be located on the same side frame of the metal frame 130, and also may be located on different side frames.

Step S200: electrically connecting tabs of the cell 140 to the corresponding poles 150, and fixing the cell 140 onto the metal frame 130.

Step S300: providing the first metal plate 110 and the second metal plate 120 on two opposite sides of the metal frame 130 so that the cell 140 is accommodated in the mounting chamber formed by the first metal plate 110, the metal frame 130, and the second metal plate 120.

In an optional embodiment, step S300 may include a sub-step: welding the first metal plate 110 and the second metal plate 120 on two opposite sides of the metal frame 130, wherein the welding includes, but are not limited to, laser welding, electromagnetic welding, and resistance welding.

Definitely, before the above steps S100 to S300 are performed, a step of preparing a positive electrode sheet, a step of preparing a negative electrode sheet, a step of preparing a separator, a step of preparing an electrolytic solution, and a step of preparing the cell 140 further may be included, which are separately described in the following.

The step of preparing the positive electrode sheet includes mixing a positive electrode active material NMC (811), a conductive agent carbon black SP (TIMCAL), and a binder PVDF (Arkema) roughly according to a mass ratio of 96:2:2, adding a solvent NMP, and stirring the mixture with a stirrer to form a uniform and stable positive electrode slurry; evenly coating the positive electrode slurry onto a positive electrode current collector aluminum foil, drying the same, and then rolling, splitting, and film-cutting the same to obtain the positive electrode sheet.

The step of preparing the negative electrode sheet includes mixing a negative electrode active material graphite, a conductive agent acetylene black, a thickening agent CMC, and a binder SBR roughly according to a mass ratio of 96.5:0.5:1.5:1.5, then adding a solvent deionized water, and stirring the mixture in a stirrer to obtain a uniform and stable negative electrode slurry; evenly coating the negative electrode slurry on a negative electrode current collector copper foil, drying the same, and then rolling, splitting, and film-cutting the same to obtain the negative electrode sheet.

The step of preparing the separator includes selecting a polyethylene porous membrane as the separator, and cutting the same into corresponding width according to design dimension for later use.

The step of preparing the electrolytic solution includes mixing ethylene carbonate (EC), ethyl methyl carbonate (EMC), and diethyl carbonate (DEC) approximately according to a volume ratio of 1:1:1 to obtain an organic solvent, and then dissolving sufficiently dried lithium salt $LiPF_6$ in the mixed solvent to formulate the electrolyte solution with a concentration about 1 mol/L.

The step of preparing a bare cell 140 of the lithium ion battery 100 includes stacking the above positive electrode sheet, the separator, and the negative electrode sheet in a laminating manner, so that the separator is located between the positive and negative electrode sheets to serve a separating effect, after the stacking is completed, wrapping around the stacked with the separator and taping by gummed paper and fixing the same to obtain the bare cell 140; subsequently, completing the procedures such as hot pressing of the bare cell 140 and welding of the tabs.

Meanwhile, the first metal plate, the second metal plate, and the metal frame 130 also need to be manufactured according to a preset design requirement, for example, a stainless steel strip with a thickness of 1 mm is used to manufacture the metal frame 130, and on a surface thereof the above step S100 is performed. Then, the metal frame 130 is welded into a set shape, such as a rectangular frame body. In manufacturing the first metal plate 110 and the second metal plate 120, a metal plate having a certain thickness may be cut into a set shape and dimension, for example, a stainless steel plate having a thickness of 0.1 mm is processed into a shape and dimension corresponding to the metal frame 130, so as to manufacture the first metal plate 110 and the second metal plate 120.

In an optional embodiment, it further may include: providing a thermal-conductive coating or an insulating composite coating on the first metal plate 110 and the second metal plate 120.

After the above step S300, processes such as baking of the cell 140, injection of the electrolytic solution, formation, exhaust, sealing, and testing may be performed, so as to obtain the finished lithium ion battery 100.

According to an embodiment of the present disclosure, the outer package of the lithium ion battery 100 and lead-out of the positive and negative electrode tabs are completed in a split assembling manner: two ultrathin metal plates (namely, the first metal plate 110 and the second metal plate 120) are welded with one metal frame 130 to form an outer package structure of the lithium ion battery 100. The metal frame 130 is provided thereon with the poles 150 of the positive and negative electrodes, the poles 150 and the metal frame 130 realize complete insulation therebetween through a polymer plastic or ceramic insulation material, and the poles 150 form firm connection and good sealing with the metal frame 130 by means of punching. The metal frame 130 is further provided thereon with the explosion-proof valve 160 and the liquid injection hole 170. The poles 150, the explosion-proof valve 160, and the liquid injection hole 170 are fabricated on the metal frame 130 in advance. When assembling the battery, the prefabricated positive and negative electrode tabs of the cell 140 are first welded to the corresponding positive and negative electrode poles 150 of the metal frame 130, after dust removal and mounting of a tab bracket are completed, the cell 140 and the metal frame 130 are fixedly assembled together, and then the two ultrathin metal sheets (namely, the first metal plate 110 and the second metal plate 120) are respectively covered on the upper and lower large surfaces of the metal frame 130, then, the first metal plate 110 and the second metal plate 120 are separately welded with the metal frame 130, so as to complete the assembling of the battery.

The lithium ion battery 100 manufactured by the manufacturing method for the lithium ion battery 100 has the advantages such as high energy density, good heat dissipation effect, relatively high safety, high packaging strength, high resistance to electrolytic solution corrosion, good long-term reliability, and lower costs.

An embodiment of the present disclosure provides an electric vehicle, which includes the lithium ion battery 100 of any one of the preceding embodiments.

Referring to FIG. 1 to FIG. 6, in conclusion, for the lithium ion battery 100 and the manufacturing method therefor and the electric vehicle including the lithium ion battery 100 provided in the embodiments of the present disclosure, the outer package structure of the lithium ion battery 100 is formed by the first metal plate 110, the second metal plate 120, and the metal frame 130. The poles 150 and the explosion-proof valve 160 are both provided on the metal frame 130, and the liquid injection hole 170 is also disposed on the metal frame 130. In the above, the poles 150 are correspondingly connected to the tabs of the cell 140, and the liquid injection hole 170 is configured to inject an electrolytic solution into a mounting space formed by the first metal plate 110, the second metal plate 120, and the metal frame 130. The outer package of the lithium ion battery 100 in the embodiments of the present disclosure is made of a metal material, wherein the first metal plate 110, the second metal plate 120, and the metal frame 130 have a relatively small thickness, thus being capable of ensuring structural reliability of the lithium ion battery 100 and having a relatively high volumetric energy density. The lithium ion battery 100 considers the advantages of a simple process design and a light weight of the pouch-type structure, and also considers the advantage of reliability of aluminum package, and can tolerate corrosion of electrolytic solution for a long time. The embodiments of the present disclosure have reliable performance and low costs, so that the lithium ion battery 100 is cost-effective. Meanwhile, the manufacturing method for the lithium ion battery 100 has simple steps and is easy to implement.

The above-mentioned are merely for preferred embodiments of the present disclosure and not intended to limit the present disclosure, and for one skilled in the art, various modifications and variations may be made to the present disclosure. Any modifications, equivalent substitutions, improvements and the like made within the spirit and principle of the present disclosure should be covered within the scope of protection of the present disclosure.

INDUSTRIAL APPLICABILITY

The lithium ion battery 100 of the present disclosure has the advantages such as high energy density, good heat dissipation effect, relatively high safety, high packaging strength, and high resistance to electrolytic solution corrosion, good long-term reliability, and lower costs.

The manufacturing method for the lithium ion battery 100 of the present disclosure has simple steps and is easy to implement. This manufacturing method can manufacture a battery having a high energy density and a good heat dissipation effect.

The electric vehicle of the present disclosure has the above lithium ion battery 100, which can save the costs and has relatively good reliability.

What is claimed is:

1. A lithium ion battery, comprising a first metal plate, a second metal plate, a metal frame, a cell, poles, and an explosion-proof valve, wherein the first metal plate, the metal frame, and the second metal plate are sequentially connected to form a mounting chamber; the cell is accommodated in the mounting chamber; the poles are provided on the metal frame in an insulating manner and are electrically connected to the cell; the explosion-proof valve is provided on the metal frame; and the metal frame is provided with a liquid injection hole, wherein the first metal plate, the second metal plate and the metal frame are made of a stainless steel, wherein a thickness of the first metal plate is 0.02-0.2 mm, a thickness of the second metal plate is 0.02-0.2 mm, and a thickness of the metal frame is 0.10-1.00 mm, and a heat-conducting aluminum plate is not provided between the cell in the mounting chamber;

wherein an insulating composite coating is provided on an outer surface of the first metal plate and an outer surface of the second metal plate, an outer surface of the insulating composite coating is a graphite thermal-conductive composite film or a graphene thermal-conductive composite film.

2. The lithium ion battery according to claim 1, wherein the lithium ion battery further comprises an insulating sealing member; and the poles are sealedly connected to the metal frame in an insulating manner through the insulating sealing member.

3. The lithium ion battery according to claim 2, wherein the poles are punched onto the metal frame.

4. The lithium ion battery according to claim 1, wherein the cell comprises a body, a first tab and a second tab; the first tab and the second tab are provided on the body; and the poles comprise a first pole electrically connected to the first tab and a second pole electrically connected to the second tab.

5. The lithium ion battery according to claim 4, wherein the first pole and the second pole are located on the same side or different sides of the metal frame.

6. The lithium ion battery according to claim 1, wherein the cell is of a shape corresponding to a shape of the metal frame.

7. A method for manufacturing the lithium ion battery according to claim 1, the method comprising:

providing poles and an explosion-proof valve on a metal frame, and opening a liquid injection hole on the metal frame;

electrically connecting tabs of a cell to corresponding poles, and fixing the cell onto the metal frame; and providing a first metal plate and a second metal plate on two opposite sides of the metal frame respectively, so that the cell is accommodated in a mounting chamber formed by the first metal plate, the metal frame, and the second metal plate;

the method further comprising:

sealedly connecting the poles to the metal frame in an insulating manner through an insulating sealing member, and providing an insulating composite coating on an outer surface of the first metal plate and an outer surface of the second metal plate.

8. The method for manufacturing the lithium ion battery according to claim 7, wherein the step of providing the poles and the explosion-proof valve on the metal frame comprises:

punching the poles onto the metal frame, and welding the explosion-proof valve onto the metal frame.

9. The method for manufacturing the lithium ion battery according to claim 7, wherein the step of providing the first metal plate and the second metal plate on two opposite sides of the metal frame respectively comprises:

welding the first metal plate and the second metal plate on the two opposite sides of the metal frame respectively, wherein the welding comprises laser welding, electromagnetic welding, or resistance welding.

10. An electric vehicle, comprising the lithium ion battery according to claim 1.

11. The lithium ion battery according to claim 1, wherein the stainless steel is austenitic stainless steel, ferritic stainless steel, or austenitic-ferritic duplex stainless steel.

* * * * *